United States Patent

Wang et al.

[11] Patent Number: 5,819,532
[45] Date of Patent: Oct. 13, 1998

[54] DYNAMIC LOAD SIGNAL FLUID CONTROLLER WITH INSTANT ON FLOW AMPLIFICATION

[75] Inventors: Jinbo Wang, Chanhassan; Donald M. Haarstad, Chaska, both of Minn.

[73] Assignee: Eaton Corporation, Cleveland, Ohio

[21] Appl. No.: 870,618

[22] Filed: Jun. 6, 1997

[51] Int. Cl.⁶ .............................. F16D 31/02; F15B 13/04
[52] U.S. Cl. ................................................ 60/384; 91/467
[58] Field of Search .............................. 60/384, 387, 494; 91/467; 137/625.24

[56] References Cited

U.S. PATENT DOCUMENTS

| | | | |
|---|---|---|---|
| 4,759,182 | 7/1988 | Haarstad | 60/384 |
| 4,958,493 | 9/1990 | Schutten et al. | 60/384 |
| 5,303,636 | 4/1994 | Stephenson et al. | 60/384 X |
| 5,329,766 | 7/1994 | Yamaguchi et al. | 60/384 |
| 5,620,026 | 4/1997 | Stephenson et al. | 60/384 X |
| 5,638,864 | 6/1997 | Haarstad et al. | 60/384 X |

*Primary Examiner*—Hoang Nguyen
*Attorney, Agent, or Firm*—L. J. Kasper

[57] ABSTRACT

A fluid controller (17) of the dynamic load sensing and flow amplification type, and including a main fluid path (35,39) having a main variable flow control orifice (43), and a fluid meter (37). Dynamic signal fluid enters a load sensing port (29) of the controller and flows through the fluid meter (37) before the main orifice (43) opens, as the controller valving is displaced from neutral to an operating position (FIG. 5). In accordance with the invention, in addition to the normal load sensing drain orifice (LD1) which closes just about the time the main orifice (43) opens, there is provided a load sensing drain orifice (LD2) which remains open somewhat after the main orifice (43) and an amplification orifice (50) open, to prevent build-up of pressure upstream of the fluid meter (37). As a result, there is no flow through the fluid meter (37) until after the amplification orifice (50) opens, and the flow amplification capability appears to the operator to come on instantaneously.

4 Claims, 6 Drawing Sheets

DYNAMIC LOAD SIGNAL FLUID CONTROLLER WITH INSTANT ON FLOW AMPLIFICATION

CROSS-REFERENCE TO RELATED APPLICATIONS

Not applicable

STATEMENT REGARDING FEDERALLY SPONSORED RESEARCH OR DEVELOPMENT

Not applicable

MICROFICHE APPENDIX

Not applicable

BACKGROUND OF THE INVENTION

The present invention relates to fluid controllers, and more particularly, to such controllers which are of both the dynamic load signal type and the flow amplification type.

Such a fluid controller is typically used to control the flow of fluid from a source of pressurized fluid, such as a vehicle pump, to a fluid pressure operated device, such as a vehicle steering cylinder, and is referred to as a steering control unit (SCU).

A fluid controller of the flow amplification type is illustrated and described in U.S. Pat. No. 4,759,182, assigned to the assignee of the present invention and incorporated herein by reference. In a flow amplification type of controller, the valving defines an amplification fluid path, including a variable amplification orifice, in parallel with the main fluid path which flows through the fluid meter. Typically, the main fluid path includes a main variable flow control orifice (A1 orifice) between the inlet port and the fluid meter, and a variable flow control orifice (A4 orifice) between the fluid meter and the cylinder port, i.e., the port in communication with the steering cylinder.

In a typical flow amplification fluid controller, the variable amplification orifice (AQ orifice) begins to open after the A1 orifice begins to open, for reasons which are generally well understood by those skilled in the art, and will not be discussed herein. The orifice phasing arrangement described has been generally satisfactory in operation, although there are certain applications where it is desirable to have the flow amplification feature operable as soon as a steering operation begins. One example would be when steering a vehicle having an unequal area steering cylinder, wherein flow amplification capability is used (in one direction of turning) to compensate for the unequal areas of the cylinder. As will be understood by those skilled in the art, the need to have the flow amplification feature fully operative when steering begins (referred to as "instant-on" flow amplification) occurs mainly during transport mode ("roading") when only small steering corrections are being made, rather than during operation in a "work mode" when relatively larger steering corrections are being made.

On most of the vehicles which would utilize a flow amplification type fluid controller or SCU, the hydraulic circuit which would include steering would be of the load sensing type. It has been found that, when using an old style, conventional, static load signal circuit, instant on flow amplification can be achieved. However, on many vehicles, the circuit including the SCU is of the "dynamic load signal" type, an example of which is illustrated and described in U.S. Pat. No. 4,620,416, assigned to the assignee of the present invention, and incorporated herein by reference. In a "dynamic signal" circuit, a portion of the flow going to the priority load circuit is diverted, and positively "feeds" the load sensing circuit, such that a small quantity of dynamic signal fluid flows through the load signal circuit, and typically combines with the main fluid path within the SCU, but downstream of the A1 orifice. Thus, rather than having a static load signal pressure, a dynamic signal circuit utilizes a flowing signal, to increase the responsiveness of the load sensing fluid source (pump or priority valve, etc.).

In a dynamic signal SCU, having flow amplification capability, there is a constant flow of dynamic signal fluid through the load sensing circuit which, even before the A1, A4, and AQ orifices are open, flows through the fluid meter and out to the steering cylinder. As a result, on a typical SCU, the steering wheel may be rotating at about 7 RPM strictly as a result of the flow of dynamic signal fluid, and because all of this fluid flows through the fluid meter, a steering operation is occurring, but with no flow amplification occurring. In other words, at this point of the operation of the SCU, the flow amplification ratio is 1:1, rather than the desired flow amplification ratio (e.g., 1.8:1 or 2.2:1, etc.).

BRIEF SUMMARY OF THE INVENTION

Accordingly, it is an object of the present invention to provide an improved fluid controller of the dynamic signal type, having flow amplification capability, wherein the flow amplification capability becomes operative almost instantaneously upon the initiation of a steering operation.

The above and other objects of the present invention are accomplished by the provision of an improved fluid controller operable to control the flow of fluid from a source of pressurized fluid to a fluid pressure operated device, the source of fluid including pressure responsive means for varying the delivery of fluid to the controller in response to changes in a dynamic load signal. The controller includes housing means defining an inlet port for connection to the source of fluid, first and second control fluid ports for connection to the fluid pressure operated device, and a load sensing port for connection to the dynamic load signal. Valve means is disposed in the housing and defines a neutral position and at least one operating position in which the housing means and the valve means cooperate to define a main fluid path providing fluid communication from the inlet port to the first control fluid port, and an amplification fluid path in parallel with the main fluid path. The main fluid path includes a main variable flow control orifice and a fluid meter, and the amplification fluid path includes a variable amplification orifice, whereby dynamic load signal fluid enters the load sensing port and flows through the main fluid path and the fluid meter before the main variable flow control orifice and the variable amplification orifice open, as the valve means is displaced from the neutral position to the operating position.

The improved fluid controller is characterized by means operable to prevent a build-up of fluid pressure in the main fluid path upstream of the fluid meter, as a result of the flow of the dynamic load signal fluid from the load sensing port into the main fluid path, at least until the main variable flow control orifice and the variable amplification orifice open. As a result, pressurized fluid does not flow through the fluid meter until the main variable flow control orifice and the variable amplification orifice both open. Thus, it is perceived by the vehicle operator that the flow amplification capability has come on "instantly".

DETAILED DESCRIPTION OF THE INVENTION

Figure 1:
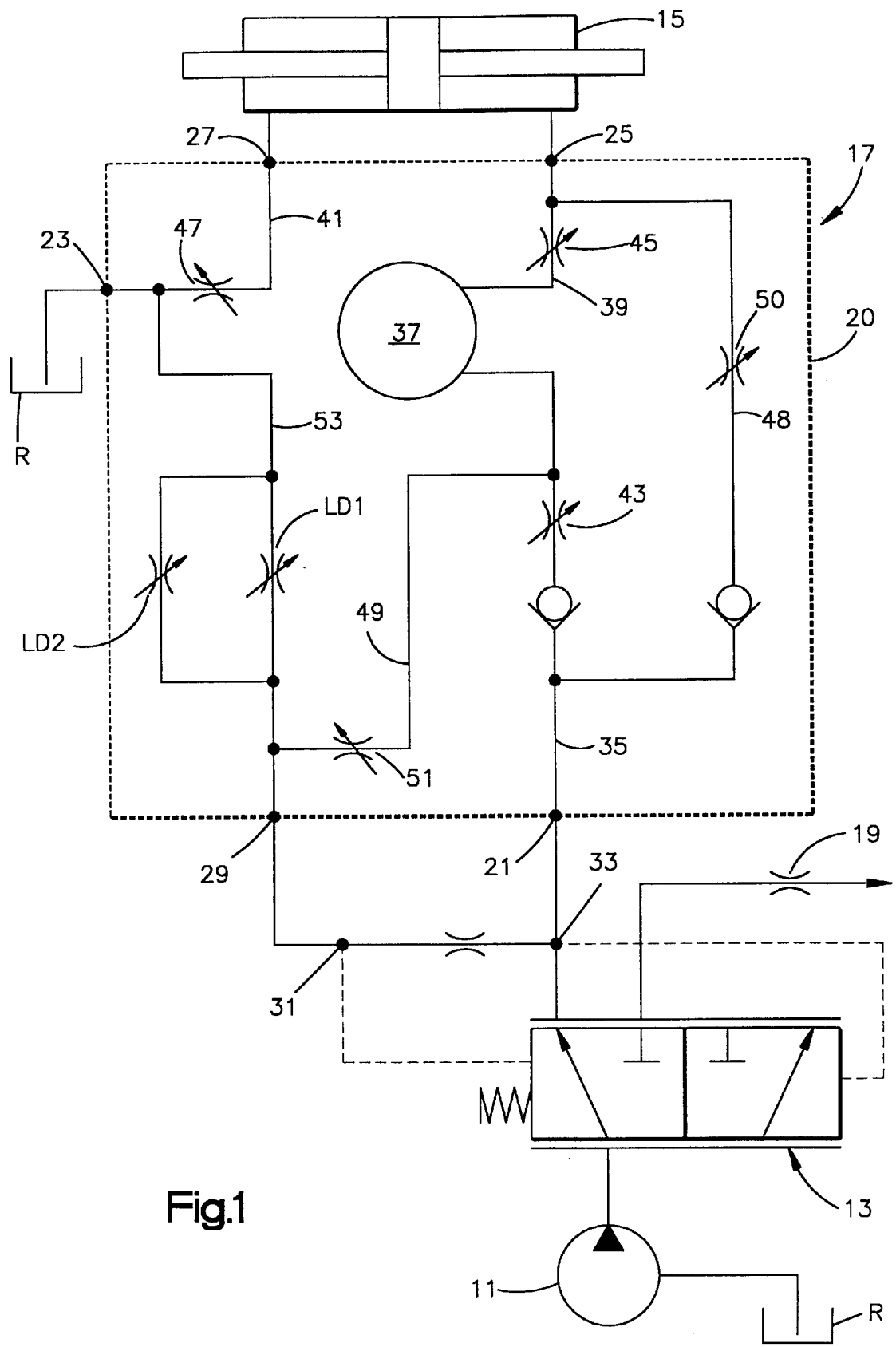
FIG. 1 is a hydraulic schematic of a dynamic load sensing, flow amplification type hydrostatic power steering system including one embodiment of the present invention.

Referring now to the drawings, which are not intended to limit the invention, FIG. 1 is a schematic of a dynamic load signal type vehicle hydrostatic power steering system, including a fluid controller made in accordance with the teachings of the present invention. The system may be made in accordance with the teachings of the above-incorporated U.S. Pat. No. 4,620,416, and will be described only briefly hereinafter.

The system includes a fluid pump 11, illustrated herein as a fixed displacement pump, and a pilot operated, load sensing priority flow control valve (LSPV), generally designated 13. The LSPV 13 apportions the flow of fluid from the pump 11 between:

(1) a primary circuit including a fluid operated steering cylinder 15, and a fluid controller, or SCU, generally designated 17; and (2) an open center auxiliary circuit, represented schematically at 19.

Referring still to FIG. 1, the fluid controller 17 includes a housing 20 (shown only schematically in FIG. 1), the housing 20 defining an inlet port 21, a return port 23 (for connection to a system reservoir R), and a pair of control (cylinder) ports 25 and 27, which are connected to the opposite ends of the steering cylinder 15. The controller 17 also includes a load signal port 29, which is connected to a dynamic load signal line 31, the line 31 also being connected to a controlled flow (CF) port 33 of the LSPV 13, in a manner well known to those skilled in the art of dynamic load sensing.

The LSPV 13 may be of the type illustrated in U.S. Pat. No. 4,043,419, assigned to the assignee of the present invention and incorporated herein by reference. For purposes of the subsequent description, and the appended claims, the pump 11 and LSPV 13 together comprise a "source of fluid" having a "pressure responsive means for varying the delivery of fluid", or functionally equivalent terms. In other words, the reference to a "source of fluid" may refer either to a pump alone, or to the combination of a pump and an LSPV, as long as there is some means of varying the output of the source in response to a load signal.

In the subject embodiment of the invention, the LSPV 13 is of the type which provides a "dynamic" load signal, i.e., one in which there is actual flow through the load signal line, rather than merely a "static" load signal, i.e., only a static pressure. Thus, a portion of fluid flowing from the LSPV 13 to the inlet port 21 of the fluid controller 17 is diverted from the CF port 33 and flows through the dynamic signal line 31 and enters the controller 17 at the LS port 29.

Referring still primarily to FIG. 1, the fluid controller 17 will now be described in greater detail. During a steering operation, the controller 17 defines a fluid path 35 communicating between the inlet port 21 and a fluid meter 37, and a fluid path 39 communicating from the fluid meter 37 to the control fluid port 25. Fluid displaced by the cylinder 15 returns through the control port 27 then flows through a fluid path 41 to the return port 23. The fluid path 35 includes a main variable flow control orifice 43 (A1 orifice), and the fluid path 39 includes a variable flow control orifice 45 (A4 orifice). The return fluid path 41 includes a variable flow control orifice 47 (A5 orifice). The fluid paths 35 and 39 together are frequently referred to as the "main fluid path", although that term would frequently be understood to also include the fluid path 41.

In parallel with the main fluid path 35,39 is an amplification flow path 48, which includes a variable amplification orifice 50 (AQ orifice). The amplification flow path 48 typically communicates with the main flow path upstream of the A1 orifice (orifice 43), and again downstream of the A4 orifice (orifice 45), as taught in the above-incorporated U.S. Pat. No. 4,759,182.

The fluid path 35 is also in communication with both the LS port 29 and the return port 23 by means of a load signal circuit 49, including a variable load signal orifice 51. The circuit 49 is connected to a drain line 53 which, in turn, is connected to the return fluid path 41, downstream of the A5 orifice.

Figure 2:
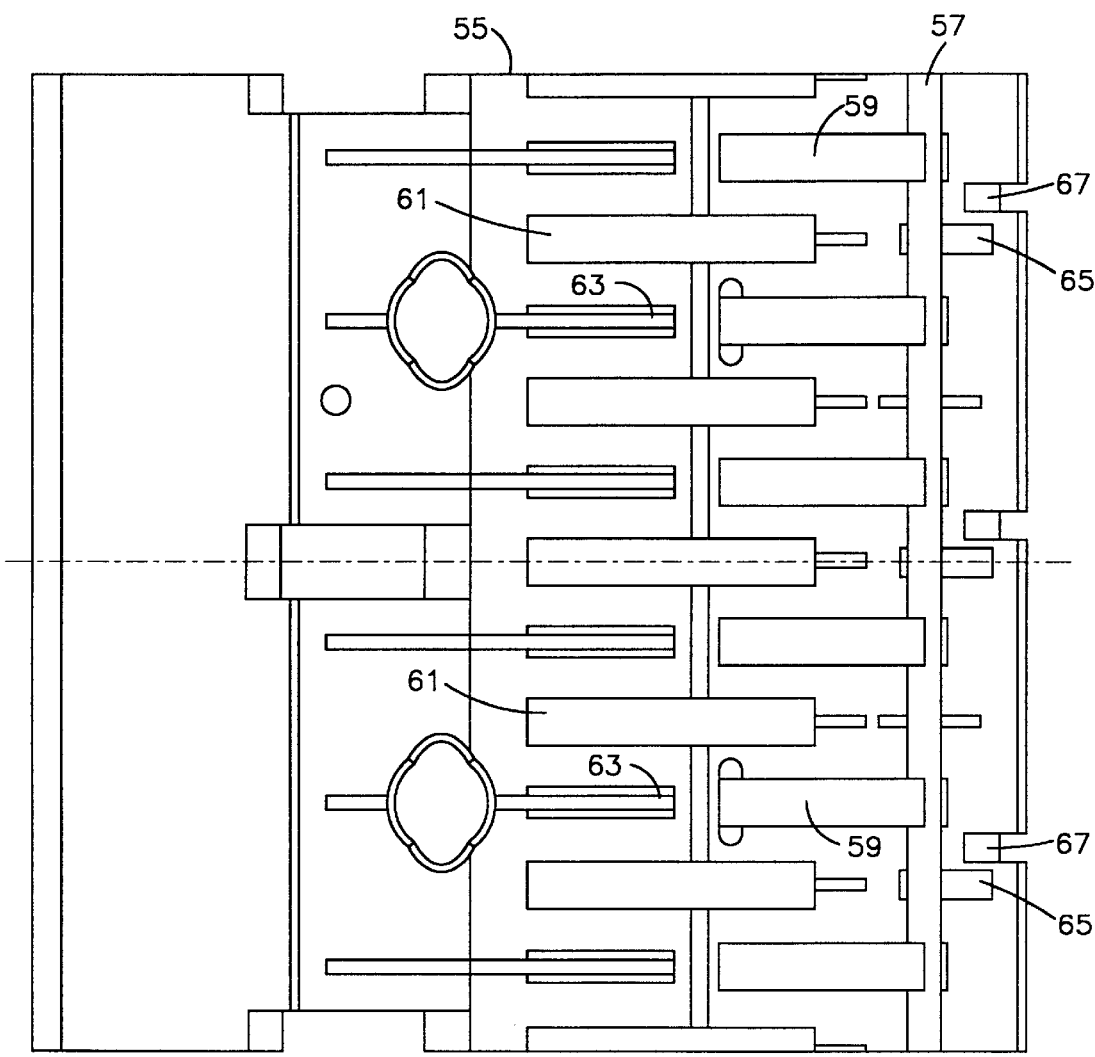
FIG. 2 is a layout, plan view of the primary valve member of the fluid controller, including the present invention.

Referring now primarily to FIG. 2, the valving of the controller 17 includes, as is well known to those skilled in the art, a rotatable, primary valve member ("spool"), generally designated 55. The spool valve 55 defines an annular groove 57, and in communication therewith, a plurality of axial slots 59. Circumferentially displaced from each of the axial slots 59 is a longer axial slot 61, and circumferentially aligned with each of the axial slots 59 is an even longer axial slot 63, To the right of the annular groove 57, the spool 55 defines a pair of axial drain slots 65, each of which has, adjacent thereto, a slot 67 which is in open communication, toward its right end in FIG. 2, with the interior of the spool 55. Other structural details of the spool 55 which are well known but are not relevant to the present invention will not be described.

Figure 3:
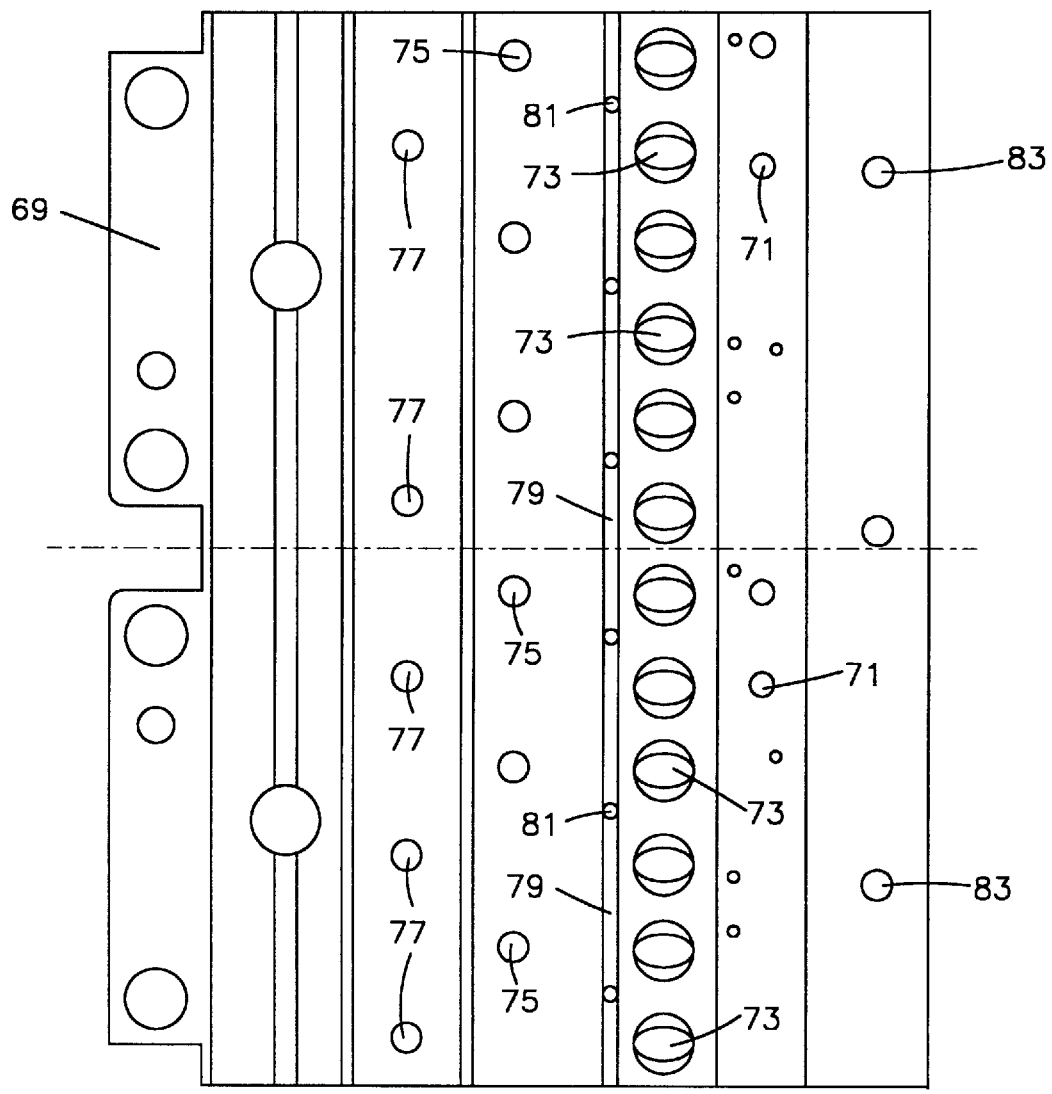
FIG. 3 is a layout, plan view of the follow-up valve member of the fluid controller of the present invention, on the same scale as FIG. 1.

Referring now primarily to FIG. 3, the valving of the controller 17 also includes a relatively rotatable, follow-up valve member ("sleeve"), generally designated 69. The sleeve valve 69 defines a plurality of pressure ports 71, in communication with the inlet port 21. To the left of the ports 71, is a plurality of meter ports 73, which communicate between the controller valving 55,69, and the expanding and contracting fluid volume chambers of the fluid meter 37. In the subject embodiment, and by way of example only, the fluid meter defines six (N) volume chambers, such that there are twelve (2N) of the meter ports 73. Disposed to the left of the meter ports 73 is a plurality of cylinder ports 75, in communication with the control port 25, and further to the left, a plurality of cylinder ports 77, in communication with the control port 27.

Disposed immediately to the left of the meter ports 73, the sleeve valve 69 defines an annular load sensing groove 79, on the surface of the sleeve 69, and a plurality of load sensing holes 81, extending radially through the sleeve 69. Disposed toward the right end of the sleeve 69 is a plurality of drain holes 83, the function of which will be described subsequently.

Figure 4:
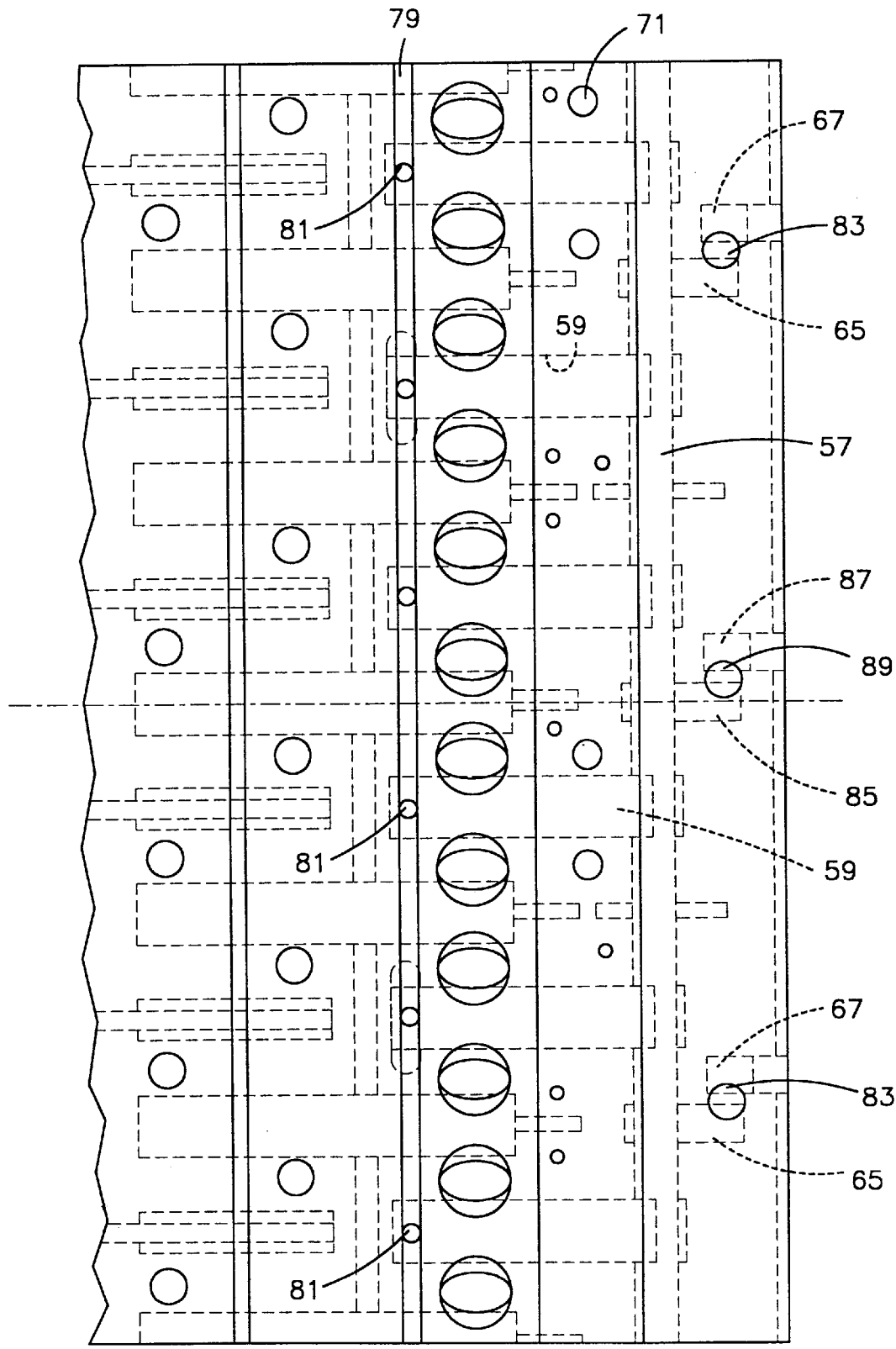
FIG. 4 is an enlarged, fragmentary overlay view of the primary and follow-up valve members in their neutral position.

Referring now primarily to FIG. 4, when the spool 55 and sleeve 69 are in their neutral position (rotationally centered), relative to each other, the pressure ports 71 are blocked from fluid communication with the axial slots 59. However, each of the axial slots 59 is in communication with one of the load sensing holes 81 in the sleeve 69. Thus, the dynamic load signal fluid 31 enters the controller 17 at the load sense port 29, then flows into the annular load sensing groove 79, then flows through the holes 81 into the respective axial slots 59. Dynamic signal fluid then flows from the slots 59 into the annular groove 57, then into the axial drain slots 65. With the spool and sleeve in the neutral position of FIG. 4, each of the drain holes 83 is in communication with both a slot 65 and a slot 67. Dynamic signal fluid is thus communicated through the slots 65, up through the holes 83 in the sleeve 69, then through the slots 67 to the interior of the spool 55, and eventually out to the return port 23.

Figure 6:
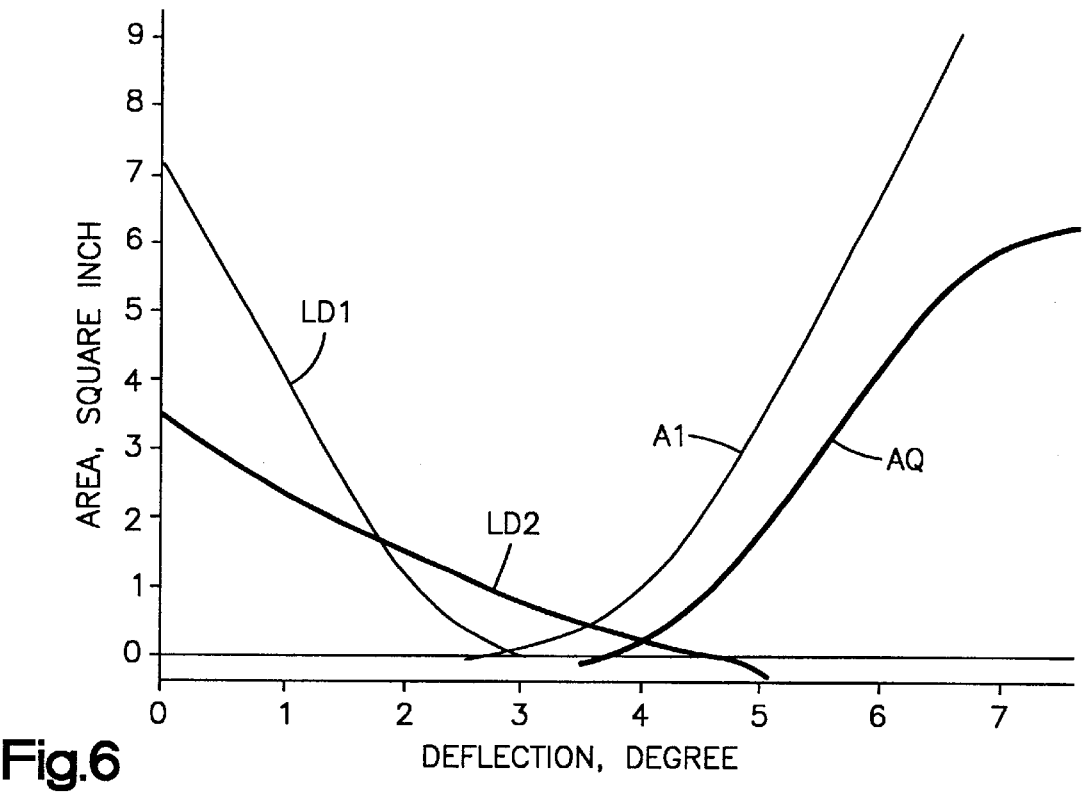
FIG. 6 is a graph of flow area versus valve deflection for the various orifices in the valving of the present invention.

The drain path just described comprises the drain line 53, shown schematically in FIG. 1, and the effective area of overlap of the holes 83 and the slots 65 and 67 together comprises a variable load sense drain orifice LD1(shown in FIG. 1). As is well known to those skilled in the art, and as is illustrated in FIG. 6, the drain orifice LD1 has a maximum flow area when the spool and sleeve are in their neutral position (deflection=0 in FIG. 6). As the spool 55 and the sleeve 69 are rotated away from neutral, the area of the drain orifice LD1 decreases until, in the subject embodiment and by way of example only, LD1 closes at approximately three degrees of deflection. As is also well known to those skilled in the art, it is necessary for the load sense drain orifice LD1 to close at about the same time that the A1 orifice (orifice 43) begins to open, in order to build appropriate pressure (load pressure plus "standby") at the inlet port 21 of the controller 17.

Referring still to FIG. 4, the spool 55 also defines an axial drain slot 85 and, adjacent thereto, a slot 87 which, in the same manner as the slot 67, is in communication with the interior of the spool 55 and therefore, is also in communication with the return port 23. The sleeve valve 69 defines a drain hole 89 which overlaps the slots 85 and 87, the effective area of overlap therebetween comprising a variable load sense drain orifice LD2. As is shown schematically in FIG. 1, the orifice LD2 is in parallel with the drain orifice LD1, described previously, and thus, serves generally the same function, i.e., to provide a flow path to tank for dynamic signal fluid when the spool 55 and sleeve 69 are at or near their neutral condition.

Figure 5:
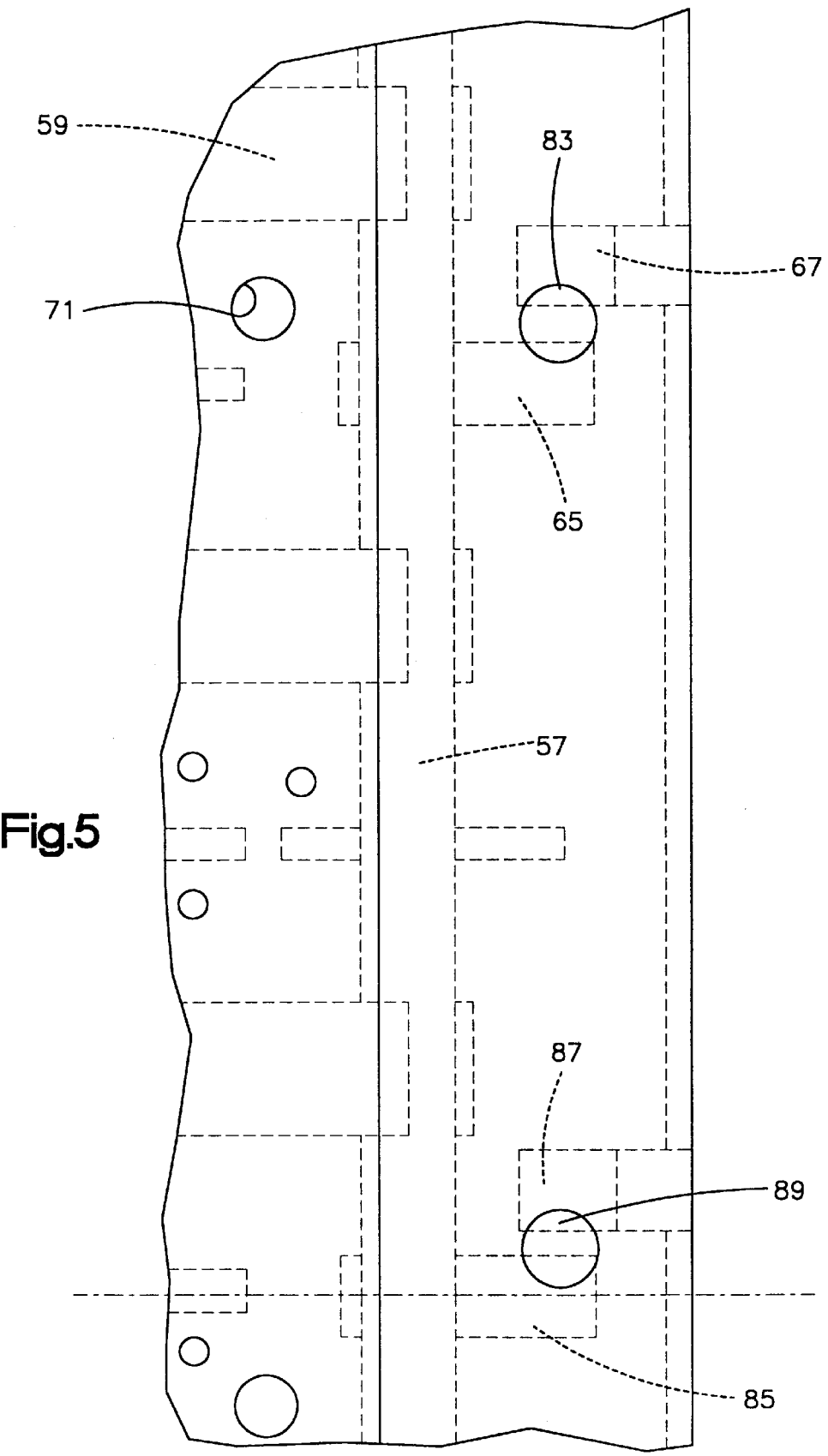
FIG. 5 is a further enlarged, fragmentary overlay view, similar to FIG. 4, but illustrating the valving displaced from the neutral position.

However, in accordance with one aspect of the present invention, the slots 85 and 87 and the hole 89 are sized and/or spaced relative to each other such that the orifice LD2 provides a very different result than that provided by the orifice LD1. Referring now primarily to FIGS. 5 and 6, when the spool and sleeve are deflected (rotationally displaced) about three degrees, LD1 is just closing, but LD2 is still open, although with just a small, and decreasing, orifice area. The presence of the orifice LD2 in the circuit at this point in the deflection of the spool-sleeve means that there is a path to the return port 23 for dynamic signal fluid entering the load sense port 29. As a result, there is insufficient fluid pressure build-up in the main fluid path 35, upstream of the fluid meter 37, to "drive" the fluid meter 37 in the manner described in the BACKGROUND OF THE INVENTION.

Figure 7:
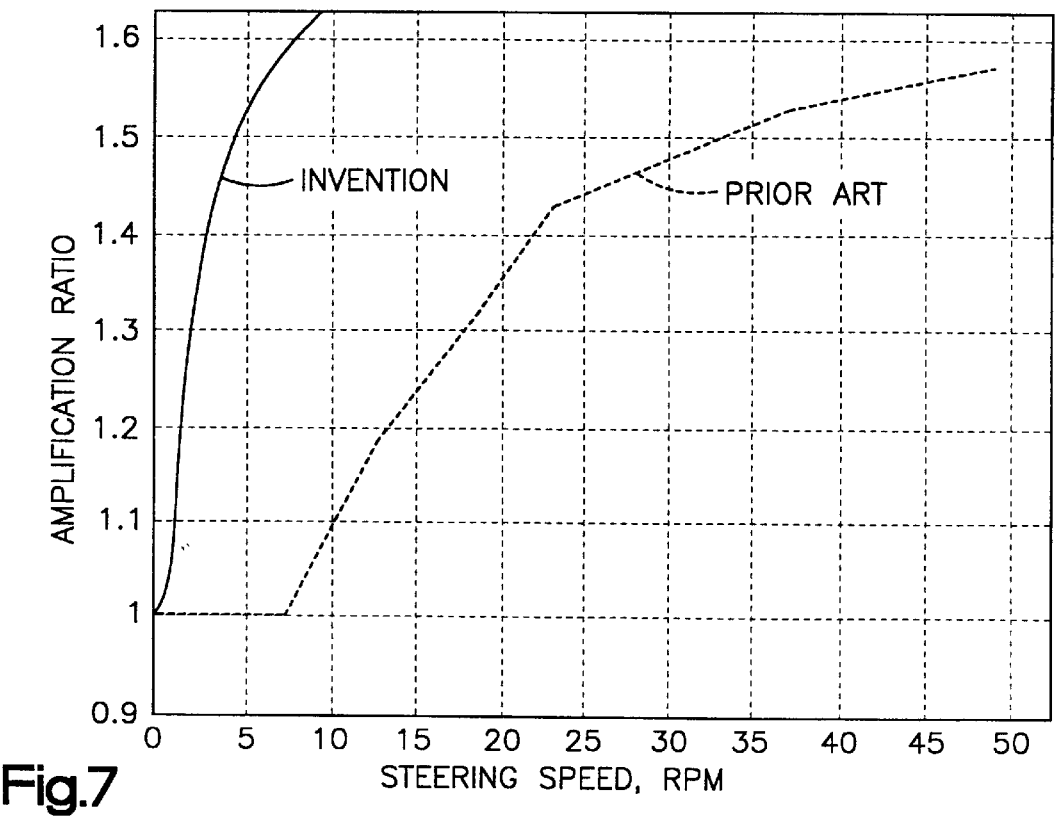
FIG. 7 is a graph of flow amplification ratio versus steering speed, in RPM, comparing the present invention to the prior art.

The difference in performance which results from this addition of the orifice LD2, in parallel with the orifice LD1, may be seen by referring to the graph of FIG. 7. In the graph of FIG. 7, the dashed line designated "PRIOR ART" represents a controller identical to the present invention, but not having the orifice LD2 of the invention. Instead the prior art controller includes only the conventional orifice LD1, but sized such that at deflection=0, the total orifice area would be equal to that of LD1+LD2. In other words, in the prior art device, LD1 consisted of three of the combinations of the slots 65 and 67 and the drain hole 83. The portion of the "PRIOR ART" curve from zero rpm. to about seven rpm. is when LD1 has closed off, and pressure builds sufficiently to drive the fluid meter 37 in the manner previously described. During this time the amplification ratio is merely 1.0:1, and the desired ratio of about 1.5:1 doesn't occur until the steering wheel is being rotated at about 33 rpm. Thus, the vehicle operator will be very aware of the gradual change in the amplification ratio.

Referring now to the solid line in FIG. 7 designated "INVENTION", wherein the controller 17 includes the orifice LD2, it may be seen that the flow amplification ratio starts at 1.0:1 at a steering wheel speed of zero rpm., but then the ratio rises rapidly, and by the time the wheel is being turned at 5 rpm., a speed less than any normal steering operation, the ratio has already reached 1.5:1. Thus, the addition of the orifice LD2, in accordance with the present invention, results in a flow amplification capability which may be characterized as "instant-on". As used herein, the term "instant-on" in reference to the flow amplification capability of a fluid controller means that the typical operator is not even aware of a change in the ratio going from 1.0:1 to whatever the eventual ratio is.

Those skilled in the art will understand that, instead of adding the LD2 orifice, it would be theoretically possible to achieve the same result simply by "extending" the LD1 orifice, so that it has the orifice area shown in FIG. 6 for LD2, from about three degrees deflection to about five degrees. In other words, it is not the particular orifice arrangement which is significant, but the orifice area, and the ability to prevent build-up of pressure until the appropriate time (deflection). As a practical matter, it is easier to add a larger orifice or hole, such as LD2, in parallel, rather that try to tailor the shape of the holes which comprise LD1.

The invention has been described in connection with an embodiment in which the load signal is communicated to the main flow path at a particular location, i.e., the axial slots 59, just downstream of the A1 orifice. However, those skilled din the art will recognize that various other arrangements of the load sensing circuit are possible, within the scope of the invention. All that is essential to the invention is to provide a means to prevent a build-up of fluid pressure in the main fluid path, upstream of the fluid meter, when dynamic signal fluid flows into the main fluid path, at least until the A1 orifice and the AQ orifice open.

Although the invention has been illustrated with the orifice LD2 being a variable orifice, the invention is not so limited. The orifice LD2 could comprise a fixed orifice, preferably having about the same orifice area as is shown in FIG. 6 for LD2 at about the time the AQ orifice begins to open. It is believed to be within the ability of those skilled in the art to determine which type of orifice arrangement is preferable for a particular fluid controller, and to determine orifice areas, phasing, etc. If the orifice LD2 is too large, the basic operation of the controller will be adversely affected by the inability to build an appropriate load signal, as was explained previously. If the orifice LD2 is too small, pressure will build upstream of the meter, and the operation of the controller will begin to look more like the "PRIOR ART" in FIG. 7.

The invention has been described in great detail in the foregoing specification, and it is believed that various alterations and modifications of the invention will become apparent to those skilled in the art from a reading and understanding of the specification. It is intended that all such alterations and modifications are included in the invention, insofar as they come within the scope of the appended claims.

We claim:

1. A fluid controller operable to control the flow of fluid from a source of pressurized fluid to a fluid pressure operated device, the source of fluid including pressure responsive means for varying the delivery of fluid to said controller in response to changes in a dynamic load signal; said controller including housing means defining an inlet port for connection to said source of fluid, first and second control fluid ports for connection to said fluid pressure operated device, and a load sensing port for connection to said dynamic load signal; valve means disposed in said housing means and defining a neutral position and at least one operating position in which said housing means and said valve means cooperate to define a main fluid path providing fluid communication from said inlet port to said first control fluid port, and an amplification fluid path in parallel with said main fluid path; said main fluid path including a main variable flow control orifice and a fluid meter, and said amplification fluid path including a variable amplification orifice, whereby dynamic load signal fluid enters said load sensing port and flows through said main fluid path and said fluid meter before said main variable flow control orifice and said variable amplification orifice open, as said valve means is displaced from said neutral position to said operating position; characterized by:

(a) means operable to prevent a build-up of fluid pressure in said main fluid path, upstream of said fluid meter, as a result of the flow of said dynamic load signal fluid from said load sensing port into said main fluid path, at least until said main variable flow control orifice and said variable amplification orifice open;

(b) whereby pressurized fluid doesn't flow through said fluid meter until said main variable flow control orifice and said variable amplification orifice open.

2. A fluid controller as claimed in claim 1 characterized by said means operable to prevent said build-up of fluid pressure comprises said valve means defining a load sensing drain orifice providing fluid communication from said load sensing port to a fluid return port defined by said housing means, and adapted for connection to a system reservoir.

3. A fluid controller as claimed in claim 1 characterized by said means operable to prevent said build-up of fluid pressure comprises said valve means defining a load sensing path providing fluid communication from said load sensing port to said main fluid path, at a location upstream of said fluid meter.

4. A fluid controller operable to control the flow of fluid from a source of pressurized fluid to a fluid pressure operated device, the source of fluid including pressure responsive means for varying the delivery of fluid to said controller in response to changes in a dynamic load signal; said controller including housing means defining an inlet port for connection to said source of fluid, first and second control fluid ports for connection to said fluid pressure operated device, and a load sensing port for connection to said dynamic load signal; valve means disposed in said housing means and defining a neutral position and at least one operating position in which said housing means and said valve means cooperate to define a main fluid path providing fluid communication from said inlet port to said first control fluid port, and an amplification fluid path in parallel with said main fluid path; said main fluid path including a main variable flow control orifice and a fluid meter, and said amplification fluid path including a variable amplification orifice, whereby dynamic load signal fluid enters said load sensing port and flows through said main fluid path and said fluid meter before said main variable flow control orifice and said variable amplification orifice open, as said valve means is displaced from said neutral position to said operating position; a load sensing drain orifice providing fluid communication from said load sensing port to a fluid return port, said load sensing drain orifice being designed to have a maximum flow area when said valve means is in said neutral position, and to be closed at approximately the time the main variable flow control orifice begins to open; characterized by:

(a) means operable to maintain said load sensing drain orifice open at least until said main variable flow control orifice and said variable amplification orifice open as said valve means is displaced from said neutral position to said operating position.

(b) whereby pressurized fluid doesn't flow through said fluid meter until said main variable flow control orifice and said variable amplification orifice open.

* * * * *